3,219,712
METHOD FOR THE PREPARATION OF TELOMER IODIDES
Murray Hauptschein, Glenside, Pa., and Milton Braid, Haddon Heights, N.J., assignors to Pennsalt Chemicals Corporation, Philadelphia, Pa., a corporation of Pennsylvania
No Drawing. Filed Mar. 25, 1963, Ser. No. 267,808
14 Claims. (Cl. 260—653.1)

This application is a continuation-in-part of abandoned copending applications Serial No. 36,144 filed June 15, 1960 of Murray Hauptschein et al., Serial No. 756,491, filed August 21, 1958 of Murray Hauptschein et al. and of Serial No. 735,702, filed May 16, 1958 of Murray Hauptschein et al.

This invention relates to halogen-containing, relatively low molecular weight linear polymers of the type generally referred to as telomers and is particularly concerned with telomers which are oily liquids at ordinary temperatures.

Halogen containing telomers of a variety of types have been prepared and many have been found to have valuable uses. Chlorofluorocarbon telomers, i.e. those containing only chlorine, fluorine and carbon, are best known and are commercially available. Chlorofluorocarbon telomer oils, for example, such as those of the formula $Cl(CF_2CFCl)_nCl$ where $n$ ranges from about 3 to 7, have excellent chemical and heat stability, and thus are suitable as lubricants, hydraulic fluids, instrument fluids etc. under severe conditions which cause hydrocarbon oils to deteriorate rapidly. These and other halogen-containing telomers may be converted into derivatives such as acids, amines, amides etc. many of which have unique applications.

A variety of methods are known for the preparation of chlorofluorocarbon telomers, some of which are used commercially.

These involve the reaction of a "telogen" halide with an olefin, usually $CF_2=CFCl$. Such telomers may be prepared, for example, by heating chlorotrifluoroethylene together with a large excess of chloroform or carbon tetrachloride in the presence of an organic peroxide, such as benzoyl peroxide. The telomer obtained is then stabilized by fluorination with cobalt trifluoride. Another method involves heating chlorotrifluoroethylene with sulfuryl chloride in the presence of a peroxide initiator. A further method involves the reaction of chlorotrifluoroethylene with bromotrichloromethane in the presence of actinic light. Still another method involves the reaction of chlorotrifluoroethylene with iodides such as that prepared by the addition of ICl to $CF_2=CFCl$ as reported by R. N. Haszeldine (Journal Chemical Society, December 19, 1955, p. 4291–4302) and by M. Hauptschein et al. (Journal American Chemical Society, v. 79, p. 2549–2553, 1957).

These prior art processes are subject to a number of disadvantages, one of the most important of which is the difficulty of controlling the molecular weight of the telomer products. Under practicable reaction conditions, it is difficult or impossible to avoid obtaining a raw telomer product containing a mixture of telomers of widely varying molecular weight often ranging from light volatile liquids which usually have relatively limited utility to high molecular weight solids which are usually also of limited utility. It has not been possible to produce at will good yields of telomers in given narrow ranges of molecular weights.

For example, it is often desired to produce telomer products of a narrow range of intermediate molecular weights, such as telomer oils consisting almost exclusively of telomers containing from four to seven olefin units per molecule. Because only limited control over the molecular weight of the telomer products is possible in accordance with prior art processes, the raw products of the telomerization reaction contain relatively small yields of the desired intermediate weight products which must be separated, usually by tedious vacuum distillation, from high or low products or both. In some cases the low molecular weight products may be recovered and reacted further, but this involves tedious and expensive processing. In some cases the low products are not suitable for further reaction and are wasted. The high molecular weight solids may sometimes be thermally cracked to produce products of lower molecular weight, but such processing is usually expensive and wasteful.

Some of these prior art procedures are subject to the further disadvantage that the reactions are potentially hazardous, particularly when carried out on a large scale, such as those involving the use of organic peroxides; or do not lend themselves to economic production procedures on a commercial scale, such as those involving the use of irradiation with light to catalyze the reaction.

In accordance with the present invention it has now been found that by using the combination of a specific type of telogen with specific haloolefins in a specific narrow range of temperatures while supplying a substantial molar excess of olefin to the reaction, it becomes possible to prepare telomer products having two and more olefin units per molecule in narrow ranges of molecular weight, and that furthermore these narrow ranges may be shifted upwardly or downwardly at will by increasing or decreasing respectively the molar ratio of olefin:iodide supplied to the reaction.

The telogens that may be used are 1,1-dichloro-1-iodoalkanes of the formula $RCCl_2I$ where R is fluorine or a CFXY radical where X may be fluorine or chlorine and Y may be fluorine, chlorine, bromine or a perfluoroalkyl, a perfluorochloroalkyl, a perfluorohydroalkyl or a perfluorochlorohydroalkyl radical. A perfluoroalkyl radical is defined as one containing only fluorine and carbon; a perfluorochloroalkyl radical is one containing only fluorine, chlorine and carbon; a perfluorohydroalkyl radical is one containing only fluorine, hydrogen and carbon in which the mole ratio of fluorine to hydrogen is at least 1:1; and a perfluorochlorohydroalkyl radical is one containing only fluorine, chlorine, hydrogen and carbon in which the mole ratio of fluorine to chlorine plus hydrogen is at least 1:1. Preferably these radicals contain from one to six carbon atoms.

The use of the defined telogens terminating in a dichloroiodo ($-CCl_2I$) group is critical to the process of the invention. Other known telogen iodides terminating in dihaloiodo groups such as $CF_2ClCFClI$ (terminating in a $-CFClI$ group) or $CFCl_2CF_2I$ or $CF_3CF_2CF_2I$ (terminating in a $-CF_2I$) group do not behave in a similar manner, i.e. they do not provide the desired control over the molecular weight of the product.

The olefins that may be used include only chlorotrifluoroethylene, $CF_2=CFCl$, and tetrafluoroethylene $$CF_2=CF_2$$

and mixtures thereof. Other similar haloethylenes such as vinylidene fluoride $CF_2=CH_2$ and perfluoropropene 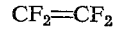 ($CF_3CF=CF_2$) behave in an entirely different manner, i.e. the desired control over the molecular weight of the product is not obtained.

The temperatures that may be used fall in the critical narrow range of 120° C. to 160° C. and preferably in the range of 130° C. to 150° C. As will be shown hereinafter at temperatures outside this range the desired control over the molecular weight of the product is not obtained. Instead of being responsive to the use of a molar excess of olefin as it is at temperatures of 120° to 160° C. the reaction becomes substantially insensitive to the olefin concentration at temperatures outside this range. Regardless of the olefin concentration used, the reaction tends to produce only one type of product at temperatures outside the defined range, viz. a product consisting entirely or mainly of telomers having only one olefin unit per molcule.

The use of a substantial molar excess of the olefin with respect to the telogen is critical for obtaining the desired products having two and more olefin units per molecule. If equimolar proportions of the olefin and telogen are employed essentially the only product obtained is the 1:1 adduct of olefin to iodide (i.e. only one olefin unit per molecule). This is in sharp contrast to the behavior of other types of telogen iodides such as $CF_2ClCFClI$ or $CF_3CF_2CF_2I$ where substantial amounts of higher telomers (although in wide ranges of molecular weight) may be obtained when using equimolar proportions of olefin and telogen.

In order to obtain products consisting predominantly of telomers having two and more olefin units per molecule the reaction should be supplied with a molar excess of olefin of at least about two moles of olefin for each mole of telogen. In a sealed autoclave reaction where a batch of telogen and olefin are charged to the autocalve which is then sealed, heated and opened after the reaction is completed, this can be accomplished by charging the autoclave with at least two moles of olefin for each mole of telogen. Preferably the olefin:iodide ratio in the charge is at least 3:1. In sealed autoclave reactions the total autoclave pressure also affects the molecular weight to some extent (probably because the solubility of the olefin in the telogen is affected by pressure) and should be at least about 200 lbs./in.$^2$ gage (at reaction temperature) and preferably at least about 300 lbs./in.$^2$ gage to insure the production of a product consisting predominantly of telomers having two or more olefin units per molecule.

As will be illustrated by the examples which follow, in sealed autoclave reactions the molecular weight of the product may be shifted upwardly or downwardly in narrow bands by shifting the olefin:iodide molar ratio upwardly or downwardly provided that the reaction temperature is maintained within the defined range. To obtain liquid oils or relatively low melting greases and waxes (i.e. telomers having about two to thirty olefin units per molecule) the molar ratio of olefin:iodide should generally range from 2:1 to 30:1 and preferably 3:1 to 15:1 and especially from 3:1 to 10:1.

In contrast, pressure reactions, where a constant pressure of olefin gas is maintained above the liquid iodide phase during the reaction, the chief factor controlling the overall effective molar ratio of olefin to telogen in the reaction is the reaction pressure, probably by its influence on the amount of olefin dissolved in the telogen. It has been found in this type of operation that the reaction may be supplied with a molar excess of olefin with respect to telogen of at least about 2:1 by maintaining a minimum pressure in the reaction vessel of at least about 200 lbs./in.$^2$ gage and continuously supplying olefin to replace that consumed in the reaction. Preferably the minimum pressure is at least about 300 lbs./in.$^2$ gage. At pressures below about 200 lbs./in.$^2$ gage it becomes impossible to supply the reaction with more than about an equimolar ratio of olefin:telogen since at such pressures the 1:1 adduct of telogen to olefin preferentially forms after which the reaction will not take up further quantities of olefin.

In constant pressure reactions the molecular weight of the product may be shifted upwardly or downwardly in narrow bands by raising or lowering the pressure to influence the effective overall molar ratio of olefin to iodide supplied to the reaction. As will be illustrated in the examples which follow, as the pressure is progressively raised, the ratio of olefin:telogen that is supplied to the reaction progressively increases. To obtain liquid oils or relatively low melting greases and waxes the reaction pressure should generally range from about 200 to 10,000 lbs./in.$^2$ gage, preferably from about 300 to 4000 lbs./in.$^2$ gage and most desirably from 300 to 2000 lbs./in.$^2$ gage.

Reaction time is not critical in the sense of determining whether or not the reaction will proceed. Reaction periods of from ½ to 20 hours and preferably from 1 to 10 hours are generally satisfactory.

In addition to the advantage of providing high yields of products of controlled molecular weight the process of the invention has the additional advantage that the telomerization proceeds by heat alone at relatively low temperatures in the absence of peroxide initiators or ultraviolet light. Peroxide initiators are generally undesirable since as mentioned previously they are somewhat hazardous and in addition tend to cause instability of the telomer oil which often must be corrected by expensive after-processing. Ultraviolet light catalysts does not generally lend itself to economical large scale production. The telomer iodides prepared in accordance with the invention, as will be explained more in detail hereafter, may be converted into valuable derivatives such as acids, amides, etc. Likewise, by replacement of the iodine with chlorine or fluorine, telomer oils having valuable uses as heat and chemically stable lubricants, instrument fluids and the like may be prepared.

Of the class of telogen iodides defined above which are used in preparing telomers according to the invention two iodides are particularly preferred, viz. 1,1-dichloro-2,2,2-trifluoro-1-iodoethane, $CF_3CCl_2I$ and 1,1,2-trichloro-2,2-difluoro-1-iodoethane, $CF_2ClCCl_2I$, both of which may be prepared from the relatively inexpensive olefin $CF_2=CCl_2$.

PREPARATION OF THE IODIDE $CF_3CCl_2I$

The iodide $CF_3CCl_2I$ may be prepared by reacting the olefin $CF_2=CCl_2$ with a mixture of iodine and iodine pentafluoride, which mixture apparently acts as a source of iodine monofluoride (IF) which adds to the olefin. This reaction is preferably carried out in the presence of a catalyst consisting of metallic aluminum or a mixture of metallic aluminum and aluminum iodide. In order to avoid the formation of the isomer $CFCl_2CF_2I$, the reaction should preferably be carried out at a temperature between −10° and 0° C. and preferably in the absence of iron in a form which is chemically attacked by the reactants or reaction products. The following examples illustrate the preparation of this iodide.

EXAMPLE 1.—PREPARATION OF $CF_3CCl_2I$ BY REACTION OF $CF_2=CCl_2$ WITH A MIXTURE OF IODINE AND IODINE PENTAFLUORIDE 56 grams (0.441 gram atom) of iodine, 24 grams (0.108 mole) of iodine pentafluoride, 2 grams of aluminum shavings of 99.99% purity, and 2 grams of aluminum iodide are heated while shaking in a 300 cubic centimeter Monel metal autoclave at 130 to 140° C. for about 2 hours. After cooling to room temperature, the autoclave is further cooled in Dry Ice and evacuated. 100 grams (0.752 mole) of $CF_2=CCl_2$ is admitted to the vessel by vacuum gaseous transfer. The autoclave is immersed in an ice bath and the reaction mixture thus maintained at 0° C. while shaking for 17 hours.

The liquid contents of the autoclave are then poured while stirring into ice cold aqueous saturated sodium bisulfite solution, and the separated organic layer is then washed again with ice water. After removal of unreacted olefin and a small amount of 1,1-dichlorotetrafluoroethane there is obtained 116 grams of dichlorotrifluoro-iodoethane which is shown by vapor liquid partition chromatographic analysis to consist of 98% of the isomer $CF_3CCl_2I$ and 2% of the isomer $CFCl_2CF_2I$. A separation of the isomer $CF_3CCl_2I$ is made chromatographically using a Perkin Elmer "B" column operating at 75° C. under a pressure of helium of 30 lbs./in.² gage. Respective elution times for air, $CFCl_2CF_2I$ and $CF_3CCl_2I$ are 0.6, 24, and 29 minutes. The isomer $CF_3CCl_2I$ has a boiling point of 45° C. at 100 mm. Hg and a melting point of about 21° C. The ultraviolet absorption maximum for this isomer in isooctane is at 295.5 m$\mu$. Analysis of this compound is as follows: Calculated for $C_2Cl_2F_3I$: C, 8.6. Found: C, 8:8.

EXAMPLE 2.—PREPARATION OF $CF_3CCl_2I$ BY REACTION OF $CF_2=CCl_2$ WITH A MIXTURE OF IODINE AND IODINE PENTAFLUORIDE 56 grams of iodine and 24 grams of iodine pentafluoride are heated for 2 hours at 130° C. in the presence of 2 grams of alumina shavings of 99.99% purity in a Monel metal autoclave. After cooling to room temperature, the autoclave is cooled in Dry Ice, evacuated and 100 grams of $CF_2=CCl_2$ is admitted by vacuum gaseous transfer. The reaction mixture is shaken in an ice bath and thus maintained at 0° C. for 17 hours. The product is worked up as in Example 1 and there is obtained 96 grams of dichlorotrifluoroiodoethane shown by vapor liquid partition chromatographic analysis to consist of 95% of the isomer $CF_3CCl_2I$ and 5% of the isomer $CFCl_2CF_2I$.

The above reaction, and the preparation of other iodides by the addition of iodine monofluoride to various olefins is described and claimed in United States Patent 3,006,973 issued October 31, 1961 to Murray Hauptschein and Milton Braid.

PREPARATION OF THE IODIDE $CF_2ClCCl_2I$

The iodide $CF_2ClCCl_2I$ is prepared by the addition of iodine monochloride (ICl) to the olefin $CF_2=CCl_2$. In order to suppress the formation of the isomeric iodide $CCl_3CF_2I$, which is unsuitable for use in the invention, this reaction should be carried out at a temperature of from −20 to +15° C. and preferably from −10 to +10° C. At room temperature and higher, undesirably large amounts of the isomer $CCl_3CF_2I$ are formed. In order to suppress the formation of this latter isomer, it is also desirable to carry out the reaction in the absence of iron in a form which is chemically attacked by the reactants or reaction products. The following example illustrates the preparation of the iodide $CF_2ClCCl_2I$.

EXAMPLE 3.—PREPARATION OF $CF_2ClCCl_2I$ BY REACTION OF $CF_2=CCl_2$ WITH ICl 166 grams (1.25 moles) of $CF_2=CCl_2$ is introduced into a glass flask cooled by means of a brine bath to −10° C. 162 grams (1 mole) of iodine monochloride is added to the liquid olefin drop by drop while vigorously stirring over a period of one-half hour while maintaining the reaction mixture at −10° C. Stirring is continued for 2 additional hours after which 35 grams of unreacted olefin is removed from the cold reaction mixture under reduced pressure.

The remaining product consists of 292 grams made up of 290 grams of the iodide $CF_2ClCCl_2I$ and 2 grams of $CF_2ClCCl_3$.

The iodide $CF_2ClCCl_2I$ is a solid at room temperature, having a boiling point of 62° C. at 75 mm. Hg and a melting point of 35–37° C. The ultraviolet absorption maximum for $CF_2ClCCl_2I$ in isooctane is at 302 m$\mu$. Analysis of this compound is as follows: Calculated for, $C_2Cl_2F_3I$: C, 8.1. Found: C, 8.5.

The preparation of the iodide $CF_2ClCCl_2I$ is further described and illustrated in United States Patent 3,047,636 issued July 31, 1962 to Murray Hauptschein and Milton Braid.

Examples of other iodides that may be employed in the process of the invention, and falling within the general class defined above, include in particular $CF_2BrCCl_2I$ prepared by adding IBr to $CF_2=CCl_2$, and those of the type $C_nF_{2n+1}CF_2CCl_2I$ where $n$ is an integer of the series 1, 2, 3, 4 etc., the value of $n$ being preferably in the range of from 1 to 6. Examples of such iodides are: $CF_3CF_2CCl_2I$, $C_3F_7CCl_2I$, $C_4F_9CCl_2I$ etc. Such iodides may be prepared by the reaction of a perfluoroalkyl iodide such as $CF_3I$, $C_2F_5I$, etc., with the olefin $CF_2=CCl_2$. The reaction may be carried out at room temperature in the presence of ultraviolet light, or by heating the perfluoroalkyl iodide and the olefin at temperatures e.g. 190° to 200° C. and pressures from 100 to 1000 lbs./in.² gage. In order to obtain the desired 1:1 adduct of iodide to olefin as distinguished from telomer iodides containing two or more olefin units, a high ratio of iodide to olefin should be employed such as ratios of the order of 5:1 to 15:1.

Other specific iodides coming within the scope of the invention are e.g. $CFCl_2CCl_2I$, $CF_3CF(CF_3)CF_2CCl_2I$, $$CF_2ClCF(CF_3)CF_2CCl_2I$$

$$CF_2ClCFClCF_2CCl_2I$$

$$CF_3CCl_2CF_2CCl_2I$$

$$CFCl_2CF_2CF_2CCl_2I$$

$$CFCl_2I$$

$$CHF_2CF_2CF_2CCl_2I$$

$$CF_3CFClCCl_2I$$

and $$CHClFCF_2CF_2CCl_2I$$

Although the invention does not depend upon any particular theory of the mechanism of the reaction, it is believed that the reaction proceeds in the following manner (as illustrated by the reaction of $CF_3CCl_2I$ and $CF_2=CFCl$):

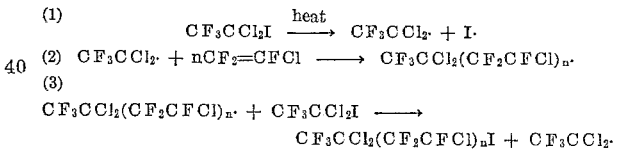

(1) $CF_3CCl_2I \xrightarrow{heat} CF_3CCl_2\cdot + I\cdot$ (2) $CF_3CCl_2\cdot + nCF_2=CFCl \longrightarrow CF_3CCl_2(CF_2CFCl)_n\cdot$ (3) $CF_3CCl_2(CF_2CFCl)_n\cdot + CF_3CCl_2I \longrightarrow$
$\qquad CF_3CCl_2(CF_2CFCl)_nI + CF_3CCl_2\cdot$ In accordance with the above mechanism, upon heating the reaction mixture a free radical is formed by the rupture of the carbon to iodine bond of the iodide (Equation 1). The free radical thus formed then reacts almost instantaneously with successive molecules of olefin to build up a telomer radical (Equation 2). The growing telomer radical is terminated by reacting with another molecule of the iodide, i.e., chain transfer with the iodide, releasing in the process another free radical capable of reacting with the further olefin (Equation 3).

The remarkable control over the molecular weight of the telomers possible in accordance with the invention is believed to be attributable to the fact that in the above telomerization reaction at the relatively low reaction temperatures specified there is little or no reaction (i.e. chain transfer) between the telomer radical and the telomer iodides present in the reaction mixture. That is to say, the reactions of Equations 1 and 3 take place to the substantial exclusion of Equations 4 and 5:

(4)
$$CF_3CCl_2(CF_2CFCl)_nI \xrightarrow{heat} CF_3CCl_2(CF_2CFCl)_n\cdot + I\cdot$$

(5)
$CF_3CCl_2(CF_2CFCl)_n\cdot + CF_3CCl_2(CF_2CFCl)_mI \longrightarrow$
$\qquad CF_3CCl_2(CF_2CFCl)_nI + CF_3CCl_2(CF_2CFCl)_m\cdot$ In contrast to the facile rupture at the specified relatively low reaction temperatures of the C–I bond of the telogen iodide $CF_3CCl_2I$, there is substantially no cleavage of the C–I bond of the telomer iodides (per Equation 4) to initiate new radical chains.

In contrast to the chain transfer step of Equation 3 which takes place readily under the specified reaction conditions, the chain transfer step of Equation 5 does not take place. That is, the telomer radical produced by reaction (2) does not react (i.e. chain transfer) significantly with telomer iodide to produce another telomer radical which could then react (i.e. chain propagate) with further olefin to produce a longer telomer chain.

If reactions (4) or (5) were to proceed to any substantial extent it follows that the telomers initially produced would continue to grow in molecular weight producing a final mixture of telomers of widely varying molecular weight. In accordance with the invention, however, in contrast to the behavior of prior telomerization reactions, and undoubtedly because of the particular combination of telogen iodides and olefins and the particular reaction temperatures employed, reactions (4) and (5) apparently do not occur to any appreciable extent and thus, once a telomer has been formed (Equation 3) it does not further react.

The homotelomer iodides provided by the invention are those having the general formulae $RCCl_2(CF_2CFCl)_nI$ and $RCCl_2(CF_2CF_2)_nI$ where R is as defined above, and where $n$ is an integer of at least 2.

The optimum value of $n$ will depend upon the end use of the telomer but for the great majority of uses will generally be in the range of from 2 to 30 inclusive and preferably in the range of from 3 to 15. It should be understood, of course, that the telomerization reaction inherently produces a mixture of individual compounds where the value of $n$ in the individuals of the mixture will vary over a certain range (although this spread in molecular weights is greatly reduced in contrast to prior processes). The individual compounds of such mixtures may, if desired, be separated, e.g. by careful distillation. For the majority of uses, however, it is more economical and in many cases more desirable to employ the mixtures rather than the individuals.

Another class of telomers coming within the scope of the invention are cotelomers prepared from a mixture of the olefins $CF_2=CFCl$ and $CF_2=CF_2$. Such cotelomers are those of the general formula $$RCCl_2(CF_2CFCl)_n(CF_2CF_2)_mI$$

where R is as defined above and where $n$ and $m$ are integers. The sum of $n+m$ is preferably in the range of from 2 to 30 and still more preferably in the range of from 3 to 15. The ratio of $n$ to $m$ will depend largely upon the $CF_2=CFCl:CF_2=CF_2$ molar ratio employed in the reaction mixture. The higher the ratio of $$CF_2=CFCl:CF_2=CF_2$$

in the reaction mixture the higher will be the ratio of $n:m$ in the telomer. It should be understood that the olefin units $(CF_2CFCl)$ and $(CF_2CF_2)$ are shown as separately grouped merely for the sake of simplicity. Actually these olefin units alternate in random order with one another, both singly and in small groups, and the telomer may begin or terminate with either olefin unit at random.

The iodide telomers of the invention are of particular value because of the variety of end products into which they may be readily converted. As noted previously, the iodine may be readily replaced by chlorine or fluorine to produce liquids or soft solids which may serve as lubricant oils, greases, instrument fluids, plasticizers and the like of high heat and chemical stability. Alternatively, by relatively simple procedures they may be converted into a wide variety of derivatives such as carboxylic acids, amides, esters, and the like.

The following examples illustrate the preparation of telomer iodides in accordance with the invention and demonstrate the excellent telomer yields and conversions obtained.

EXAMPLE 4.—REACTION OF $CF_3CCl_2I$ WITH $CF_2=CFCl$ (6:1 OLEFIN:IODIDE MOLAR RATIO)

A 300 cc. Monel metal autoclave is charged with 60 grams (0.213 mole) of $CF_3CCl_2I$ prepared by the procedure of Example 1. The autoclave and contents is cooled in solid carbon dioxide and evacuated, and is then charged with 148 grams (1.27 moles) of chlorotrifluoroethylene by vacuum gaseous transfer. The autoclave is sealed and heated at 144° to 145° C. for 17 hours while shaking. During this period the pressure drops from 900 lbs./in.² gage (at 145° C.) to less than 100 lbs./in.² gage.

The autoclave is cooled and vented and 22 grams of unreacted chlorotrifluoroethylene is recovered by condensation in refrigerated receivers. There remains 186 grams of liquid product having a boiling range of 80° C. at 25 mm. Hg to 250° C. at about 0.001 mm. Hg.

This product comprises a mixture of telomer iodides of the formula $CF_3CCl_2(CF_2CFCl)_nI$ containing insignificant amounts of telomer in which the value of $n$ is less than 2 or greater than 7 and consists approximately 75% of telomers in which the value of $n$ is in the range of from 4 to 6.

This product is distilled in vacuo to separate 41 grams of a lighter fraction consisting of a pink oil of light to moderate viscosity boiling up to 90° C. at about 0.1 mm. Hg from 145 grams of a heavier fraction of a slightly yellow oil of medium to heavy viscosity.

The conversion to, and yield of, liquid telomers (based on starting iodide) is essentially quantitative.

EXAMPLE 5.—REACTION OF $CF_3CCl_2I$ WITH $CF_2=CFCl$ (3.2:1 MOLAR RATIO OF OLEFIN:IODIDE)

Following the procedures of Example 4, a 140 cc. Monel autoclave is charged with a mixture of 35.3 grams (0.127 mole) of $CF_3CCl_2I$ and 47.6 grams (0.408 mole) of $CF_2=CFCl$. The autoclave is heated with shaking at 140 to 145° C. for 5 hours. The pressure drops from about 550 lbs./in.² gage (at 145° C.) to about 200 lbs./in.² gage during this period.

From this reaction there is recovered 20.5 grams of volatile material consisting of 4.5 grams of unreacted iodide, and 16 grams of unreacted olefin, 53.5 grams of a liquid product is obtained, consisting of a mixture of telomer iodides of the formula $CF_3CCl_2(CF_2CFCl)_nI$ composed substantially entirely of telomer in which the value of $n$ ranges from 1 to 5, approximately 90% consisting of telomers in which the value of $n$ is in the range of from 2 to 3.

This material was distilled at about 0.1 mm. Hg into the following fractions:

(a) 32 grams of a yellow light oil having a refractive index $n_D^{28}$ 1.440, a boiling range of 30° to 80° C. at about 0.1 mm. Hg and consisting essentially of telomers of the above formula in which the value of $n$ ranges from 1 to 2.

(b) 20 grams of a reddish clear oil having a refractive index $n_D^{28}$ 1.437, a boiling range of 80° C. to 127° C. at about 0.1 mm. Hg and consisting essentially of telomers of the above formula in which the value of $n$ ranges from 2 to 3.

(c) 1.5 grams of a stillpot residue consisting of an amber colored oil, consisting essentially of telomers in which the value of $n$ ranges from 3 to 5.

The yield of liquid product (based on converted iodide) is essentially quantitative and the conversion (based on starting iodide) is 87%.

EXAMPLE 6.—REACTION OF $CF_3CCl_2I$ WITH $CF_2=CFCl$ (10:1 MOLAR RATIO OF OLEFIN:IODIDE)

Following the procedures of Example 4, a 300 cc. Monel metal autoclave is charged with 40 grams (0.143 mole) of $CF_3CCl_2I$ and 167 grams (1.43 moles) of $CF_2=CFCl$. The autoclave is heated with shaking for 15 hours at a temperature of 140° C. The pressure drops from 600 lbs./in.² gage (at 140 C.) to 250 lbs./in.² gage during this period.

On venting the autoclave, there is recovered 37 grams of unreacted olefin. Remaining in the autoclave is 170 grams of a pink, soft, waxy solid consisting of telomer iodides of the formula $CF_3CCl_2(CF_2CFCl)_nI$ consisting essentially of telomers in which the value of $n$ ranges from 5 to 12 and mostly telomers in which the value of $n$ ranges from about 7 to 10.

EXAMPLE 7.—REACTION OF $CF_2ClCCl_2I$ WITH $CF_2=CFCl$ (6:1 MOLAR RATIO OF OLEFIN:IODIDE)

Using the procedures of Example 4 a 300 cc. Monel metal autoclave is charged with 69 grams (0.234 moles) of $CF_2ClCCl_2I$ and 162 grams (1.39 moles) of chlorotrifluoroethylene. The autoclave is sealed and heated while shaking for 4 hours at 140° C. During this period the pressure drops from 500 lbs./in.² gage (at 140° C.) to about 300 lbs./in.² gage.

On venting the autoclave there is recovered 23 grams of chlorotrifluoroethylene which is condensed in refrigerated receivers. A liquid product consisting of 208 grams of a yellow oil is recovered consisting of a mixture of telomer iodides of the formula $CF_2ClCCl_2(CF_2CFCl)_nI$ containing very little material where the value of $n$ is less than 2 or greater than 7 and consisting approximately of 80% of telomer iodides in which the value of $n$ is in the range of 4 to 6.

The yield of, and conversion to, liquid telomer iodides based on starting iodide is essentially quantitative.

EXAMPLE 8.—REACTION OF $CF_2ClCCl_2I$ with $CF_2=CFCl$ (6.5:1 MOLAR RATIO OF OLEFIN:IODIDE)

Following the procedures of Example 4, a 1.4 liter Monel metal autoclave is charged with a mixture of 260 grams (0.881 mole) of $CF_2ClCCl_2I$ and 667 grams (5.72 moles) of $CF_2=CFCl$. The autoclave is sealed and heated while shaking at 135° to 145° C. for 12.5 hours. During this period the pressure drops from 600 lbs./in.² gage (at 140° C.) to about 300 lbs./in.² gage.

Upon venting the autoclave there is recovered 99 grams of unreacted olefin. Remaining in the autoclave there is 828 grams of a heavy yellow oil consisting of a mixture of telomer iodides of the formula $CF_2ClCCl_2(CF_2CFCl)_nI$ containing very little material in which the value of $n$ is less than 2 or greater than 8 and consisting approximately 80% of telomer iodides in which the value of $n$ is in the range of from 4 to 6. This oil is distilled and 90 grams of a yellow oil boiling up to 120° C. at about 0.1 mm. Hg (mostly 100° to 120° C. at about 0.1 mm. Hg) is collected. This fraction consists predominantly of the telomer iodides where $n$ ranges from 2–3. More than 90% of the 738 grams of heavy oil which remains undistilled is constituted of the telomer iodides where the value of $n$ ranges from 4 to 7.

EXAMPLE 9.—REACTION OF $CF_2ClCCl_2I$ WITH $CF_2=CFCl$ (7:1 MOLAR RATIO OF OLEFIN:IODIDE)

Following the procedures of Example 4, 63 grams (0.213 mole) of $CF_2ClCCl_2I$ and 173 grams (1.48 moles) of $CF_2=CFCl$ are charged to a 300 cubic centimeter Monel metal autoclave. The autoclave is sealed and heated at 140° to 144° C. for 4 hours with shaking during which period the pressure drops from 650 lbs./in² gage (at 140° C.) to about 400 lbs./in.² gage.

Upon venting the autoclave 64 grams of chlorotrifluoroethylene is recovered. The liquid product remaining in the autoclave is 172 grams of a yellow oil, consisting of telomer iodides of the formula $CF_2ClCCl_2(CF_2CFCl)_nI$ containing very little material in which the value of $n$ is less than 2 or greater than 8, approximately 70% being telomer iodides in which the value of $n$ is in the range of from 5 to 6. This product is distilled in vacuo to produce a fraction consisting of 44 grams of a pink oil of low to moderate viscosity having a boiling point up to 108° C. at about 0.1 mm. Hg and 128 grams of an undistilled portion consisting of a yellow oil of medium to heavy viscosity consisting essentially of a mixture of telomer iodides of the above formula in which the value of $n$ ranges from 4 to 8.

EXAMPLE 10.—REACTION OF $CF_2ClCCl_2I$ WITH $CF_2=CFCl$ (7:1 MOLAR RATIO OF OLEFIN:IODIDE)

Example 9 is repeated under essentially the same conditions except that the reaction is conducted at a somewhat lower temperature (130° C.) and for a longer period (18 hours).

From this reaction there is recovered 169 grams of a yellow oil consisting of a mixture of telomer iodides of the formula $CF_2ClCCl_2(CF_2CFCl)_nI$ containing little or no material where the value of $n$ is less than 2 or greater than 9, approximately 70% being telomer iodides in which the value of $n$ is in the range of from 5 to 7.

EXAMPLE 11.—REACTION OF $CF_2ClCCl_2I$ WITH $CF_2=CFCl$ (4.5:1 MOLAR RATIO OF OLEFIN:IODIDE)

Following the procedure of Example 4, a mixture of 84 grams (0.284 mole) of $CF_2ClCCl_2I$ and 150 grams (1.29 moles of $CF_2=CFCl$ is charged to a 300 cubic centimeter Monel metal autoclave which is then sealed and heated while shaking at 140 to 144° C. for 5½ hours. During this period the pressure drops from 600 lbs./in.² gage at 140° C. to about 100 lbs./in.² gage.

Upon venting the autoclave there is recovered 33 grams of unreacted chlorotrifluoroethylene. A liquid product oil is obtained totalling 201 grams and consisting of a mixture of telomer iodides of the formula $CF_2ClCCl_2(CF_2CFCl)_nI$ where the value of $n$ ranges from 1 to 6, approximately 75% being telomers in which the value of $n$ is in the range of from 2 to 4. These liquid products are distilled and separated into 136 grams of a pink oil fraction of low to medium viscosity boiling up to 109° C. at about 0.1 mm. Hg and an undistilled fraction consisting of 65 grams of a yellow oil of medium viscosity.

The yield of and conversion to liquid telomers based on the starting iodide is essentially quantitative.

EXAMPLE 12.—REACTION OF $CF_2ClCCl_2I$ WITH $CF_2=CFCl$ (15:1 MOLAR RATIO OF OLEFIN:IODIDE)

Following the procedures of Example 4, a 300 cubic centimeter Monel metal autoclave is charged with 30 grams (0.1075 mole) of $CF_2ClCCl_2I$ and 188 grams (1.61 moles) of $CF_2=CFCl$ after which the autoclave is sealed and heated for 18 hours with shaking at 140° to 145° C. During this period the pressure drops from 650 lbs./in.² gage (at 140° C.) to about 300 lbs./in.² gage.

Upon venting the autoclave there is recovered 40 grams of unreacted olefin and 178 grams of a waxy pink solid consisting of telomer iodides of the formula

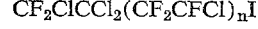
$CF_2ClCCl_2(CF_2CFCl)_nI$ consisting substantially entirely of telomers in which the value of $n$ ranges from 10 to 20 and mostly of telomers in which the value of $n$ ranges from 10 to 15.

The following examples (Examples 13 and 14) illustrate the critical relationship between the reaction temperature and ability to control the molecular weight of the telomer product within desired relatively narrow ranges. In Example 13 where a reaction temperature of approximately 110° C. and a molar ratio of olefin:iodide of 6.5:1 was used, the product consisted mostly of low molecular weight telomers, while in Example 14 carried out over substantially the same conditions but at a temperature of 170° C. the product was again predominantly low molecular weight telomers.

EXAMPLE 13.—REACTION OF $CF_2ClCCl_2I$ WITH $CF_2=CFCl$ (6.5:1 MOLAR RATIO OF OLEFIN: IODIDE) AT 110° C.

A 300 milliliter Monel autoclave is charged according to the procedures described in the previous examples with 55 grams (0.187 mole) of $CF_2ClCCl_2I$ and 142 grams (1.22 moles) of $CF_2=CFCl$. The autoclave is heated to a temperature of 110° C. for 15½ hours during which the pressure drops only slightly from a maximum pressure of approximately 500 p.s.i.g. Only a small amount of olefin reacted as evidenced by the recovery of about 120 grams of the original olefin. A total liquid product of 75 grams was recovered of which about 80% boils up to 60° C. at about 0.1 mm. Hg consisting of telomer iodides of the formula $CF_2ClCCl_2(CF_2CFCl)_nI$, most of the product being telomers where $n=1$ with a minor amount of telomer iodides where the value of $n$ is 2 to 3. This example illustrates the insensitivity of the reaction to the olefin:iodide ratio at a reaction temperature of 110° C. Although the olefin:iodide ratio was 6.5:1, only low molecular weight products were obtained.

EXAMPLE 14.—REACTION OF $CF_2ClCCl_2I$ WITH $CF_2=CFCl$ (MOLAR RATIO OF OLEFIN:IODIDE OF 6.5:1) AT 170° C.

A 300 cc. Monel autoclave is charged as described in the previous examples with 55 grams (0.187 mole) of $CF_2ClCCl_2I$ and 140 grams (1.20 mole) of $CF_2=CFCl$. The autoclave was heated at 170° C. The pressure dropped from 1000 p.s.i.g. (at 170° C.) to 900 p.s.i.g. during the reaction. Reaction occurred rapidly and was complete with an hour. The product of this reaction was essentially a liquid boiling up to 113° C. at about 0.1 mm. Hg consisting of telomer iodides of the formula $CF_2ClCCl_2(CF_2CFCl)_nI$ where the value of $n$ ranges from about 1 to 3, mostly consisting of telomers where $n$ equals 1. This is in sharp contrast to results obtained in Example 8 where at a reaction temperature of 140° C. and at the same molar ratio of olefin:iodide, viz 6.5:1, most of the product is a heavy oil where the value of $n$ is in the range of about 4 to 6. Thus, at temperatures of 170° C. the reaction is substantially insensitive to the molar ratio of olefin:iodide and the desired control over the molecular weight is not obtained.

The following examples (Examples 15 to 18) illustrate a second preferred procedure for carrying out the telomerization in which the olefin pressure is maintained constant throughout the reaction. In this type of procedure, as previously pointed out, the effective overall molar ratio of olefin:telogen supplied to the reaction, and thus the molecular weight of the product is readily controlled by varying the reaction pressure. In general the higher the reaction pressure the higher the molecular weight of the telomer product.

EXAMPLE 15.—REACTION OF $CF_2ClCCl_2I$ WITH $CF_2=CFCl$ (CONSTANT PRESSURE OF 270 P.S.I.G. (LBS./IN.$^2$ GAGE))

A three gallon stainless steel autoclave equipped with a stirrer is charged with about 3200 grams of $CF_2ClCCl_2I$. The autoclave is heated to a temperature of 144° C. while $CF_2=CFCl$ is fed to the autoclave to maintain a constant pressure of approximately 270 p.s.i.g. over a period of about 8 hours. From this reaction there is recovered about 5000 grams of telomer iodides of the formula $CF_2ClCCl_2(CF_2CFCl)_nI$ wherein the value of $n$ is mostly in the range of from two to three.

EXAMPLE 16.—REACTION OF $CF_2ClCCl_2I$ WITH $CF_2=CFCl$ (CONSTANT PRESSURE OF 330 P.S.I.G.)

A three gallon stainless steel autoclave equipped with a stirrer is charged with 3200 grams (10.84 moles) of $CF_2ClCCl_2I$. The autoclave is heated to a temperature of 135° to 138° C. while $CF_2=CFCl$ is fed to the autoclave to maintain a constant pressure of approximately 330 p.s.i.g. over a period of approximately 8 hours. From this reaction there is recovered 5295 grams of telomer iodides of the formula $CF_2ClCCl_2(CF_2CFCl)_nI$, the product consisting essentially of telomers in which the value of $n$ ranges from two to three (mostly two). This product is chlorinated as described in Example 23 to provide a light weight oil.

EXAMPLE 17.—REACTION OF $CF_2ClCCl_2I$ WITH $CF_2=CFCl$ (CONSTANT PRESSURE OF 600 P.S.I.G.)

A 3 gallon stainless steel autoclave equipped with a stirrer is charged with 3210 grams (10.88 moles) of $CF_2ClCCl_2I$. The autoclave is heated to a temperature of 138 to 140° C. while $CF_2=CFCl$ is fed to the autoclave to maintain a constant pressure of approximately 600 p.s.i.g. over a period of 9¼ hours. Stirring was continued for 3 additional hours. From this reaction there is recovered 7555 grams of telomer iodides of the formula $CF_2ClCCl_2(CF_2CFCl)_nI$, the product consisting essentially of telomers in which the value of $n$ ranges from about 3 to 5. This product is chlorinated as described in Example 24, to provide a medium weight oil.

EXAMPLE 18.—REACTION OF $CF_2ClCCl_2I$ WITH $CF_2=CFCl$ (CONSTANT PRESSURE OF ABOUT 1000 P.S.I.G.)

A three gallon stainless steel autoclave equipped with a stirrer is charged with 3235 grams (10.97 moles) of $CF_2ClCCl_2I$. The autoclave is heated to a temperature of 139° to 140° C. while $CF_2=CFCl$ is fed to the autoclave to maintain a constant pressure of approximately 1000 p.s.i.g. over a period of about 7½ hours. Stirring was continued for an additional 3½ hours. From this reaction there is recovered 12,785 grams of telomer iodides of the formula $CF_2ClCCl_2(CF_2CFCl)_nI$, the product consisting essentially of telomers in which the value of $n$ ranges from about 4 to 7 averaging about 6. Part of this product is chlorinated in accordance with Example 25 to provide a heavy oil.

EXAMPLE 19.—REACTION OF $CF_3CCl_2I$ WITH $CF_2=CF_2$ (MOLAR RATIO OF OLEFIN TO IODIDE OF 2:1).

To a 140 cubic centimeter Monel metal autoclave containing 55.8 grams (0.2 mole) of $CF_3CCl_2I$, cooled in liquid nitrogen and evacuated, there is admitted by vacuum gaseous transfer 41 grams (0.41 mole) of tetrafluoroethylene. The autoclave is heated at 142° C. for 16.5 hours while shaking. During this period the pressure drops from about 1000 lbs./in.$^2$ (at 142° C.) to about 300 lbs./in.$^2$ gage. On venting the autoclave 15 grams of unreacted tetrafluoroethylene is collected. Remaining in the autoclave is 79 grams of a liquid product consisting of a mixture of telomer iodides of the formula $CF_3CCl_2(CF_2CF_2)_nI$ consisting almost entirely of telomers where the value of $n$ ranges from 1 to 6 and 90% of telomers in which the value of $n$ is in the range of from 1 to 3. By distillation of this liquid product in vacuo there is separated 69 grams of a slightly pink liquid having a boiling range of 55° to 97° C. at 30–33 mm. Hg and a refractive index $n_D^{30}$ 1.391. A residue weighing 10 grams of a slightly pink soft solid remains undistilled.

By more careful fractional distillation using a small still column packed with stainless steel helices, the following fractions consisting essentially of individual compounds, are separated:

(a) 24 grams of a pink liquid, the middle cut of which has a boiling point of 65° C. at 50 mm. Hg and a refractive index $n_D^{25}$ 1.4054, consisting essentially of the compound $CF_3CCl_2(CF_2CF_2)_2I$.

*Analysis.*—Calculated for $C_4Cl_2F_7I$: C, 12.7. Found: C, 13.5.

(b) 31 grams of a pink liquid, the middle cut of which has a boiling point of 96° C. at 50 mm. Hg and a refractive index $n_D^{25}$ 1.3846, consisting essentially of the compound $CF_3CCl_2(CF_2CF_2)_2I$.

*Analysis.*—Calculated for $C_6Cl_2F_{11}I$: C, 15.1. Found: C, 15.4.

(c) 8 grams of a liquid, the middle cut of which has a boiling point of 33.5–34.5° C. at about 0.1 mm. Hg and a refractive index $n_D^{25}$ 1.371, consisting essentially of the compound $CF_3CCl_2(CF_2CF_2)_3I$.

*Analysis.*—Calculated for $C_8Cl_2F_{15}I$: C, 16.6. Found: C, 16.6.

(d) 4 grams of a soft solid having a boiling point mainly of 50° C. at 0.1 mm. Hg and consisting substantially of the compound $CF_3CCl_2(CF_2CF_2)_4I$.

*Analysis.*—Calculated for $C_{10}Cl_2F_{19}I$: C, 17.7. Found: C, 17.5.

(e) 4 grams of an almost white solid having a melting point of about 75–82° C. and consisting of telomer iodides of the above formula where the value of *n* ranges from 5 to 6.

EXAMPLE 20.—REACTION OF $CF_3CCl_2I$ WITH $CF_2=CF_2$ (MOLAR RATIO OF OLEFIN:IODIDE OF 5:1)

A 300 cubic centimeter Monel autoclave is charged with 55.8 grams (0.2 mole) of $CF_3CCl_2I$ and 99 grams (0.99 mole) of $CF_2=CF_2$ according to the procedures of Example 13. This mixture is heated for 15½ hours at 142° C. while shaking. During this period the pressure drops from about 1000 lbs./in.$^2$ gage (at 142° C.) to about 300 lbs./in.$^2$ gage.

Upon venting the autoclave there is recovered 15 grams of unreacted $CF_2=CF_2$. Remaining in the autoclave is 130 grams of a white soft semi-solid mixture of telomer iodides of the formula $CF_3CCl_2(CF_2CF_2)_nI$ consisting essentially of telomers in which the value of *n* ranges from 1 to 10, and 90% of telomers in which the value of *n* ranges from 2 to 6. Analysis of this mixture shows that the average value of *n* is 3.5.

*Analysis.*—Calculated for $C_9Cl_2F_{17}I$: C, 17.15; Cl, 11.4. Found: C, 17.17; Cl, 11.6.

A 41 gram aliquot of this mixture of telomer iodides is separated by fractional distillation into the following fractions:

(a) 4 grams of a colorless liquid having a refractive index $n_D^{29}$ 1.3924, boiling up to 33° C. at 10 mm. Hg consisting essentially of the telomer iodides $CF_3CCl_2(CF_2CF_2)_nI$ where $n=1$ to 2.

(b) 21 grams of an almost colorless liquid having a refractive index $n_D^{31}$ 1.3799, having a boiling range of from 33° C. to 107° C. at 10 mm. Hg, and consisting essentially of telomer iodides of the above formula where $n=2$ to 3.

(c) 3 grams of a pink liquid having a refractive index $n_D^{31}$ 1.3673 having a boiling range of from 107° to 123° C. at 10 mm. Hg and consisting essentially of telomers of the above formula where $n=3$ to 4.

(d) 6 grams of a waxy solid having a boiling range of from 123° C. at 10 mm. Hg to about 80° C. at about 0.1 mm. Hg, and consisting essentially of telomers of the above formula where $n=4$ to 5.

(e) 7 grams of a white solid residue consisting essentially of telomers of the above formula in which the value of *n* ranges from about 5 to 10, the average value of *n* being shown by analysis to be 7.

*Analysis.*—Calculated for $C_{16}Cl_2F_{31}I$: C, 19.63. Found: C, 19.67.

EXAMPLE 21.—REACTION OF $CF_3CCl_2I$ WITH $CF_2=CFCl$ and $CF_2=CF_2$ (MOLAR RATIO OF $CF_2=CF_2$:$CF_2=CFCl$:$CF_3CCl_2I$ OF 3:2:1)

A 300 cubic centimeter Monel metal autoclave is charged with 55.8 grams (0.2 moles) of $CF_3CCl_2I$ and is then cooled in Dry Ice and evacuated. To the autoclave there is admitted by gaseous vacuum transfer 46.6 grams (0.4 mole) of chlorotrifluoroethylene. The autoclave is further cooled in liquid nitrogen and 60 grams (0.6 mole) of tetrafluoroethylene is similarly transferred to the autoclave. The reaction mixture (3:2:1 molar ratio of $CF_2=CF_2$:$CF_2=CFCl$:$CF_3CCl_2I$) is heated at 135° to 139° C. for about 17 hours while shaking. During this period the pressure drops from about 1000 lbs./in.$^2$ gage (at 135° C.) to about 250 lbs./in.$^2$ gage. Upon venting the autoclave there is recovered 36 grams of volatile material which is condensed in a liquid nitrogen cooled receiver. By analysis of this material by vapor liquid partition chromatographic and infrared spectroscopic analyses, the volatile mixture is shown to consist essentially of 11.5 grams of $CF_2=CF_2$, 12 grams of $CF_2=CFCl$, 7 grams of perfluorocyclobutane and 5 grams of chloroperfluorocyclobutane.

Remaining in the autoclave is 123 grams of a colorless, slightly cloudy oil consisting of co-telomer iodides of the formula of $CF_3CCl_2(CF_2CF_2)_n(CF_2CFCl)_mI$ in which the average ratio of n:m is about 1.5:1 and consisting essentially of telomers in which the value $n+m$ is in the range of from 2 to 10, the average value of $n+m$ being about 4.

This product is separated by distillation into the following fractions:

(a) 32 grams of a pink liquid having a refractive index $n_D^{30}$ 1.399, and a boiling range up to about 38° C. at about 0.1 mm. Hg, and consisting mainly of telomers of the above formula in which $n+m=2$ but containing some telomers where $n+m=3$.

(b) 50 grams of a nearly colorless liquid having a refractive index $n_D^{29}$ 1.395 and a boiling range of 38° C. to 105° C. at about 0.1 mm. Hg and consisting mainly of telomers of the above formula where $n+m$ ranges from 3 to 4 but containing some telomers where $n+m$ ranges from 5 to 6.

(c) 9 grams of a viscous liquid turning to a mushy solid at about 25° C. having a boiling range of 105° to 118° C. at about 0.1 mm. Hg and consisting essentially of telomers of the above formula where $n+m=7$.

(d) 30 grams of a residue of a nearly white solid consisting of telomers of the above formula where the average value of $n+m$ is 7 and containing some telomers where $n+m$ ranges up to 10.

The telomer iodides produced as described above may be converted by chlorination or fluorination into liquids, soft solids and waxes of good heat and chemical stability. The chlorination may be carried out by bubbling gaseous chlorine through the telomers heated to temperatures ranging from 100° C. to 250° C. and preferably from 125° C. to 200° C. The chlorination may be carried out at atmospheric or super-atmospheric pressures and is usually complete in less than 1 hour. Iodine chlorides are given off in the course of the chlorination, particularly iodine monochloride, which ordinarily distills off. Usually the progress of the reaction can be followed by the distillation of iodine monochloride; when this ceases to be evolved the reaction is usually substantially complete. After the chlorination, dissolved chlorine may be purged from the reaction mixture with a gas such as dry nitrogen. Although often not necessary, the reaction products may if desired be washed to remove possible traces of acidic impurities and metal halides if the chlorination has been carried out in a metal reactor. One suitable washing procedure is to first wash the products with saturated aqueous sodium bisulfite solution made basic with sodium hydroxide and then with water after which the products are dried.

The fluorination of the telomer iodides may be carried out according to well known procedures using elemental fluorine, bromine trifluoride, chlorine trifluoride, or cobalt trifluoride. Using cobalt trifluoride, for example, the reaction may be carried out by adding the cobalt trifluoride to the telomer iodides with good agitation while maintaining a temperature of from 100° to 250° C. The fluorination with cobalt trifluoride is most conveniently carried out at atmospheric pressure, although if desired slightly elevated pressures may be employed.

An inexpensive fluorinating agent found to be highly desirable is $SbCl_2F_3$. This relatively mild fluorinating agent may be prepared by the reaction of relatively inexpensive hydrogen fluoride and $SbCl_5$, in contrast to the fluorinating agents mentioned above which all require the use of relatively expensive elemental fluorine in their preparation. Using $SbCl_2F_3$, the fluorination of the telomer iodides is carried out by adding the telomer iodides to the $SbCl_2F_3$ with good agitation while heating to temperatures ranging up to 200° C. and preferably from 50° to 170° C. The most convenient fluorination pressure is atmospheric although elevated pressures may be employed if desired.

The telomer products produced by chlorination or fluorination of the telomer iodides are in general those obtained by replacement of the iodine with chlorine or fluorine. The fluorinated or chlorinated telomers thus have the general formulae:

$$RCCl_2(CF_2CFCl)_nX; \ RCCl_2(CF_2CF_2)_nX; \ \text{and} \ RCCl_2(CF_2CFCl)_n(CF_2CF_2)_mX$$

where R, X, $n$ and $m$ are as defined above.

The preferred chlorinated or fluorinated products are those derived from the olefin $CF_2=CFCl$, that is, telomers having the general formula $RCCl_2(CF_2CFCl)_nX$, and particularly those of the formulae:

$$CF_3CCl_2(CF_2CFCl)_nCl; \ CF_2ClCCl_2(CF_2CFCl)_nCl; \\ CF_3CCl_2(CF_2CFCl)_nF; \ \text{and} \ CF_2ClCl_2(CF_2CFCl)_nF$$

Telomers of this type, particularly where the value of $n$ is in the range of from 2 to and 30 and more usually from 2 to 15 provide valuable oils, greases and waxes of high heat and chemical stability. The melting point of these products, in general, increases with increasing molecular weight. Of particular value are the telomer oils of this type consisting of mixtures of telomers in which the value of $n$ is in the range of from 3 to 8. These find valuable uses as lubricants, hydraulic fluids, damping fluids, such as gyroscope fluids, plasticizers for polymers such as polymers of chlorotrifluoroethylene and the like, heat transfer fluids and the like where the combination of high heat stability and resistance to chemical attack is important. They are also useful as polish additives, mold release agents, and the like. Greases of similar properties useful for example as stop-cock lubricants are provided by telomers of this type having somewhat higher molecular weight, e.g., where $n$ is from 7 to 20 blended with those of lower molecular weight. The higher melting waxes provide excellent potting and sealing materials for electrical components, particularly in chemically corrosive atmospheres.

Another preferred class of chlorinated or fluorinated telomers are co-telomers having the general formula:

$$RCCl_2(CF_2CFCl)_n(CF_2CF_2)_mX$$

particularly those of the series $$CF_3CCl_2(CF_2CFCl)_n(CF_2CF_2)_mX \ \text{and} \\ CF_2ClCCl_2(CF_2CFCl)_n(CF_2CF_2)_mX$$

where X may be chlorine or fluorine, and the value of $n+m$ is in the range of from 2 to 30 and more usually from 2 to 15. The presence of the $(CF_2CF_2)$ olefin units tends to increase the heat and chemical stability of the telomer in contrast to telomers containing only the olefin unit $(CF_2CFCl)$. On the other hand, the $(CF_2CF_2)$ units tend to decrease the liquidous range of the telomers (that is the range of molecular weights over which the telomers are liquid at room temperature), and thus the desired balance between chemical stability and liquidous range for any particular application is achieved by varying the $n:m$ ratio in the co-telomer.

Also of interest are the chlorinated and fluorinated telomer iodides containing the repeating $(CF_2CF_2)$ unit, namely telomers of the formula: $RCCl_2(CF_2CF_2)_nX$. Those in which the value of $n$ ranges from 2 to 30 and particularly those of the formulae $$CF_3CCl_2(CF_2CF_2)_nF \ \text{and} \ CF_2ClCCl_2(CF_2CF_2)_nF$$

being of particular interest. The liquid members of the series have exceptionally high heat and chemical stability useful, for example, as heat transfer fluids, coolants, refrigerants and dielectric liquids while those of the higher series where $n$ equals about 4 and higher are generally solids. The waxy solids have good electrical properties and may be employed as potting compounds for electrical products for use in highly corrosive atmospheres. The liquid telomers of this series are also useful as plasticizers for fluorinated high polymers such as solid high polymers of tetrafluoroethylene.

Under relatively mild fluorinating conditions, such as with the use of $SbCl_2F_3$ at temperatures of from 50° to 170° C., only the iodine of the telomer iodide will be replaced by fluorine to give the type of structures listed above. If, however, relatively vigorous fluorinating conditions are employed, such as the use of cobalt trifluoride at temperatures of from 150° C. to 250° C., one of the chlorines of the —$CCl_2$— group introduced by the telogen iodide $RCCl_2I$ may also be replaced by fluorine to produce telomers such as those of the series $$CF_3CClF(CF_2CFCl)_nF \ \text{or} \ CF_2ClCFCl(CF_2CFCl)_nF$$

The following examples illustrate suitable procedures for chlorinating and fluorinating the telomer iodides of the invention and the products obtained.

EXAMPLE 22.—CHLORINATION OF TELOMER IODIDE $CF_3CCl_2(CF_2CFCl)_nI$

A 300 cc. Monel autoclave is charged with 135 grams (0.163 mole) of telomer iodides of the formula $$CF_3CCl_2(CF_2CFCl)_nI$$

prepared in accordance with Example 4 consisting of telomers in which the value of $n$ ranges from 2 to 7, approximately 75% of the telomers having $n$ values of from 4 to 6. 75 grams (1.06 moles) of chlorine is added to the autoclave and the mixture is heated while shaking for 16 hours at 170° C. The autoclave is allowed to cool, and excess chlorine is vented from the reaction mixture.

The reaction products remaining in the autoclave are washed with water, and then with aqueous saturated basic sodium bisulfite solution and again with water, and finally dried over anhydrous calcium sulfate.

There is obtained 115 grams of oil consisting of telomers of the formula $CF_3CCl_2(CF_2CFCl)_nCl$ containing little material in which the value of $n$ is less than 2 or greater than 7 and approximately 75% of telomers in which the value of $n$ ranges from 4 to 6.

This liquid product is distilled in a small Vigreux distillation unit and the following fractions are obtained.

(a) 38 grams of a colorless liquid having a refractive index $n_D^{26}$ 1.402 and a boiling range of from 35° to 95° C. at about 0.1 mm. Hg and consisting of telomers of the above formula in which the value of $n$ ranges from 2 to 4. Anlysis of the mixture shows that the average value of $n$ is 3.

*Analysis.*—Calculated for $C_8Cl_6F_{12}$: C, 17.9; Cl, 39.6. Found: C, 18.0; Cl, 39.2. This liquid has the following viscosities:

38.2 centistokes at 32° F.
12.3 centistokes at 72° F.
6.3 centistokes at 100° F.
4.5 centistokes at 120° F.
3.24 centistokes at 140° F.
2.65 centistokes at 160° F.
2.15 centistokes at 180° F.
1.76 centistokes at 200° F.
1.64 centistokes at 210° F. (extrapolated)

The A.S.T.M. slope of this oil is 0.97 [determined by plotting the above viscosity values on A.S.T.M. Standard Viscosity-Temperature Charts for liquid petroleum products (D-341-43)].

This fraction has the following densities:

1.897 grams per cubic centimeter at 770° F.
1.879 grams per cubic centimeter at 100° F.
1.839 grams per cubic centimeter at 150° F.

(b) 54 grams of a colorless oil having a refractive index $n_D^{26}$ 1.411 and a boiling range of from 95° to 165° C. at about 0.1 mm. Hg consisting of telomers of the above formula where $n$ ranges from 3 to 5. Analysis of the mixture shows the average value of $n$ to be 4.

*Analysis.*—Calculated for: $C_{10}Cl_7F_{15}$: C, 18.4; Cl, 38.0. Found: C, 18.7; Cl, 38.6. This fraction has the following viscosities:

149.4 centistokes at 90.5° F.
100.8 centistokes at 100° F.
48.4 centistokes at 120° F.
24.6 centistokes at 140° F.
15.2 centistokes at 160° F.
10.04 centistokes at 180° F.
7.28 centistokes at 200° F.
6.0 centistokes at 210° F. (extrapolated)

The A.S.T.M. slope of this oil (determined as described above) is 0.97.

This oil has the following densities:

1.956 grams per cubic centimeter at 770° F.
1.937 grams per cubic centimeter at 100° F.
1.900 grams per cubic centimeter at 150° F.

(c) 14 grams of a soft white wax having a boiling range of from 165° to 196° C. at 0.1 mm. Hg consisting predominantly of telomers of the above formula where the value of $n$ ranges from 5 to 7.

(d) 6 grams of a residue of a slightly yellow wax consisting predominantly of telomers in which the value of $n$ ranges from 6 to 8.

EXAMPLE 23.—CHLORINATION OF TELOMER IODIDES

Telomer iodide product prepared in accordance with Example 16 is placed in a three-necked flask equipped with a stirrer and reflux condenser. Elemental chlorine is passed through the telomer iodide at a temperature of 140° to 165° C. for about 4 hours. The chlorinated product consists of telomer chlorides of the formula $$CF_2ClCCl_2(CF_2CFCl)_nCl$$

where the value of $n$ ranges from about two to three (mostly two), this product being a light oil of good lubricant properties having a viscosity of 4.43 centistokes at 100° F.

EXAMPLE 24.—CHLORINATION OF TELOMER IODIDES

Telomer iodide product prepared in accordance with Example 17 is chlorinated as described in Example 23. The chlorinated product consists of telomer chlorides of the formula $CF_2ClCCl_2(CF_2CFCl)_nCl$ where the value of $n$ ranges from about three to five (averaging about four), this product being a medium weight oil of good lubricant properties, having a viscosity of 52.5 centistokes at 100° F.

EXAMPLE 25.—CHLORINATION OF TELOMER CHLORIDES

Telomer iodide product prepared in accordance with Example 18 is chlorinated as described in Example 23. The chlorinated product consists of telomer chlorides of the formula $CF_2ClCCl_2(CF_2CFCl)_nCl$ where the value of $n$ ranges from about four to seven (averaging about six), this product being a heavy oil of good lubricant properties having a viscosity of 1323 centistokes at 100° F.

EXAMPLE 26.—FLUORINATION OF TELOMER IODIDES OF $CF_3CCl_2(CF_2CFCl)_nI$ WITH COBALT TRIFLUORIDE

Into a 500 cubic centimeter Monel metal flask equipped with a metal Hershberg stirrer there is introduced 82 grams of telomer iodides of the formula $$CF_3CCl_2(CF_2CFCl)_nI$$

prepared in accordance with the procedures of Example 4 consisting predominantly of telomers in which the value of $n$ ranges from 4 to 7. To these liquid telomers, vigorously stirred, there are added at 1 hour intervals two 50 gram portions and one 25 gram portion of cobalt trifluoride. Between additions the mixture is heated at 200° C. Stirring and heating at 200° C. are continued for 1 hour after the last addition.

The reaction mixture is extracted with several portions of 1,1,2-trichlorotrifluoroethane. The extract is filtered to remove solids, and the filtrate is washed with 10% aqueous sodium hydroxide, then with water and dried with anhydrous calcium sulfate. The solvent is then removed by distillation.

50 grams of an oil is obtained consisting of a mixture of telomers of the formula $CF_3CFCl(CF_2CFCl)_nF$ and $$CF_3CCl_2(CF_2CFCl)_nF$$

consisting mostly of telomers in which the value of $n$ is in the range of from 4 to 6. Telomers of the former type result from replacement of one of the chlorines of the latter type with fluorine during the fluorination.

This liquid product is distilled under reduced pressure and the following fractions are collected:

(a) 4 grams of a colorless liquid boiling up to 84° C. at about 0.1 mm. Hg.

(b) 36 grams of a colorless oil having a refractive index $n_D^{25}$ 1.399 and a boiling range of 84° C. to 190° C. at about 0.1 mm. Hg. This oil has the following viscosities:

124.4 centistokes at 100° F.
58.8 centistokes at 120° F.
29.3 centistokes at 140° F.
17.5 centistokes at 160° F.
11.2 centistokes at 180° F.
7.6 centistokes at 200° F.
6.5 centistokes at 210° F. (extropolated)

The A.S.T.M. slope of this oil (determined as described above) is 0.99.

This oil has the following densities:

1.950 grams per cubic centimeter at 77° F.
1.934 grams per cubic centimeter at 110° F.
1.897 grams per cubic centimeter at 150° F.

A slightly narrower cut of fluorinated telomers corresponding to fraction (b) taken with the boiling range 100° C. to 187° C. at about 0.1 mm. Hg analyzes as a mixture of $CF_3CFCl(CF_2CFCl)_nF$ and $CF_3CCl_2(CF_2CFCl)_nF$ containing 80% of the latter telomer, in which the value of $n$ is five.

*Analysis.*—Calculated for 80% $C_{12}F_{19}Cl_7$ and 20% $C_{12}F_{20}Cl_6$: C, 19.22; Cl, 32.13. Found: C, 19:66, Cl, 32.49.

(c) 3 grams of a residue of waxy product.

EXAMPLE 27.—CHLORINATION OF $CF_2ClCCl_2(CF_2CFCl)_nI$ TELOMER IODIDES

Elemental chlorine is passed for 7 hours into 375 grams (0.428 mole) of a mixture of telomer iodides heated at 170° C. in a glass reactor, the telomer mixture being prepared in accordance with Example 8 and consisting of telomers in which the value of $n$ ranges from 2 to 8, and the average value of $n$ being about 5. After about one-half hour, there is a vigorous distillation of iodine monochloride from the reactor which subsides after approximately one-quarter hour; the chlorination is then substantially complete. After the total chlorination period dissolved chlorine is purged from the reaction mixture with dry nitrogen gas. The crude reaction products are washed with saturated aqueous sodium bisulfite solution made basic with sodium hydroxide and then with water. The water insoluble oil consisting of telomer chlorides of the formula $CF_2ClCCl_2(CF_2CFCl)_nCl$ is dried with anhydrous calcium sulfate and then distilled in a Vigreux distillation unit and the following fractions are collected after a small forerun:

(a) 6 grams of a fraction boiling up to 53° C. at about 0.1 mm. Hg consisting of telomer chlorides of the above formula where the value of $n$ is mostly 2.

(b) 109 grams of a colorless oil having a refractive index $n_D^{33}$ 1.420 having a boiling range of 53° C. to 115° C. at about 0.1 mm. Hg, consisting of telomers in which the value of $n$ ranges predominantly from about 3 to 5, the average value of $n$ being about 4. This oil has the following viscosities:

29.8 centistokes at 100° F.
8.06 centistokes at 150° F.
4.71 centistokes at 180° F.
3.59 centistokes at 200° F.
3.15 centistokes at 210° F. (extrapolated)

The A.S.T.M. slope of this oil (determined as described above) is 1.04. This oil has the following densities:

1.930 grams per cubic centimeter at 77° F.
1,912 grams per cubic centimeter at 100° F.
1.876 grams per cubic centimeter at 150° F.

This oil is analyzed as follows—Calculated for $C_{10}F_{14}Cl_8$: C, 17.93; Cl, 42.35. Found: C, 17.96; Cl, 43.08.

(c) 200 grams of a colorless oil having a refractive index $n_D^{33}$ 1.422 and a boiling range of 115° C. to 213° C. at about 0.1 mm. Hg, consisting essentially of telomers of the above formula where the value of $n$ ranges predominantly from 5 to 7, the average value of $n$ being about 6. This oil has the following viscosities:

1,825 centistokes at 100° F.
148.1 centistokes at 180° F.
52.9 centistokes at 180° F.
31.2 centistokes at 200° F.
24.5 centistokes at 210° F. (extrapolated)

The A.S.T.M. slope of this oil (determined as described above) is 0.93. This oil has the following densities:

1.988 grams per cubic centimeter at 77° F.
1.969 grams per cubic centimeter at 100° F.
1.936 grams per cubic centimeter at 150° F.

This oil is analyzed as follows—Calculated for $C_{13}F_{18.5}Cl_{9.5}$: C, 18.49; Cl, 39.89. Found C, 18.95; Cl, 39.83.

(d) 6 grams of a residue of a waxy solid consisting essentially of telomers in which the value of $n$ ranges predominantly from 7 to 8.

EXAMPLE 28.—FLUORINATION OF TELOMER IODIDES $CF_2ClCCl_2(CF_2CFCl)_nI$ WITH ANTIMONY DICHLOROTRIFLUORIDE

To 95 grams of $SbF_3Cl_2$ there is added under an atmosphere of nitrogen during a period of about one-half while stirring vigorously, 160 grams of telomer iodides of the formula $CF_2ClCCl_2(CF_2CFCl)_nI$ prepared in accordance with Example 8, substantially free from telomers where the value of $n$ is less than 2 or greater than 8, approximately 80% of the mixture consisting of telomers in which the value of $n$ ranges from 4 to 6. The temperature of the reaction mixture rises during the addition from room temperature to about 50° C. and it is then further heated to 105°–110° C. and stirred for two hours. After cooling to 50° C., an additional 50 grams of $SbF_3Cl_2$ is added drop by drop and the reaction mixture is then reheated to 110° C. and stirred for about one hour. During the total reaction period 20 grams of crystalline iodine is evolved from the reaction and condensed in a Dry Ice-cooled receiver.

To the cooled reaction mixture there is added 200 ml. of 1,1,2-trichlorotrifluoroethane. The resulting mixture is hydrolyzed by pouring into a mixture of ice and water, the water insoluble layer is separated and washed with a 10% aqueous sodium hydroxide solution and then with water, after which it is dried with anhydrous magnesium sulfate. The solvent is removed by distillation. There is obtained 129 grams of a clear oil comprising the telomer fluorides $CF_2ClCCl_2(CF_2CFCl)_nF$ consisting of a mixture of telomers in which the value of $n$ ranges from 2 to 8 and in which approximately 80% of the mixtures consists of telomers in which the $n$ value ranges from 4 to 6. This telomer product has a boiling range predominantly from 60° C. to 230° C. at about 0.1 mm. Hg.

This product is distilled in a small Vigreux distillation unit and the following fractions are obtained.

(a) 27 grams of a colorless liquid having a boiling range from 60° to 130° C. at about 0.1 mm. Hg and a refractive index $n_D^{30}$ 1.410 consisting essentially of the telomers $CF_2ClCCl_2(CF_2CFCl)_nF$ in which $n$ has an average value of 4.

*Analysis.*—Calculated for $C_{10}Cl_7F_{15}$: C, 18.4. Found: C, 18.5.

This fraction has the following viscosities:

18.6 centistokes at 110° F.
6.21 centistokes at 150° F.
3.87 centistokes at 180° F.
2.88 centistokes at 200° F.
2.62 centistokes at 210° F. (extrapolated)

The A.S.T.M. slope of this oil is 1.02 (determined as described above).

Densities of this fraction are as follows:

1.925 grams per cubic centimeter at 77° F.
1.908 grams per cubic centimeter at 110° F.
1.870 grams per cubic centimeter at 150° F.

(b) 76 grams of a viscous, clear, colorless oil having a boiling range of from 130° C. to 230° C. at about 0.1 mm. Hg and a refractive index $n_D^{31}$ 1.417 consisting of the telomers where $n$ has values from 5 to 7. This fraction has the following viscosities:

765.8 centistokes at 100° F.
87.9 centistokes at 150° F.
35.7 centistokes at 180° F.
22.1 centistokes at 200° F.
17.2 centistokes at 210° F. (extrapolated)

The A.S.T.M. slope of this fraction (determined as described above) is 0.90.

Densities of this fraction are as follows:

1.984 grams per cubic centimeter at 77° F.
1.965 grams per cubic centimeter at 100° F.
1.932 grams per cubic centimeter at 150° F.

(c) 2 grams of a residue of waxy solids consisting of telomers where $n=7$–8.

The exceptional stability of telomers prepared in accordance with the invention is believed attributable at least in part to the relatively mild conditions under which they are prepared, viz. at relatively low temperatures and in the absence of initiators such as peroxides, azo compounds or ultra-violet light which tend to introduce unstable fragments into the product and/or to promote the formation of unstable side products. The products of the invention are substantially free from side products as prepared and thus need no expensive after-processing to improve their stability.

Particularly preferred of the telomer oils, greases and waxes of the invention which are based on the olefin $CF_2=CFCl$ are those of the general formula $$CF_2YCCl_2(CF_2CFCl)_nX$$

where Y is fluorine or a perfluoroalkyl group having from one to six carbon atoms and X is fluorine or chlorine, the value of $n$ being preferably in the range of from 3 to 15. These telomers, particularly where X is fluorine, have exceptional stability and when used in polishes, waxes fabric finishes and the like impart exceptionally high water repellency, resistance to soiling etc.

The exceptional stability of the telomer oils produced according to the above examples is illustrated by the following comparative tests:

Test 1

Three samples of telomer oil are prepared. Sample $(a)$ consists of telomer chlorides of the formula $$CF_3CCl_2(CF_2CFCl)_nCl$$

prepared in accordance in accordance with Exampleo 18v prepared in accordance with Example 22 where the value of $n$ is mostly in the range of from 3 to 5. Samples $(b)$ and $(c)$ are samples of two commercially available chlorofluorocarbon telomer oils of similar molecular weight and prepared by prior art procedures from the olefin $CF_2=CFCl$. Samples $(a)$, $(b)$ and $(c)$ are placed in separate Carius combustion tubes, sealed under air and tested for thermal stability by heating in a Carius furnace at 330° C. After one hour the tubes are opened and examined for odor. They are then closed and heating is continued for an additional 6½ hours. Periodically, the samples are examined for color, the appearance of which is an indication of thermal degradation. The results of this test are as follows:

| Sample | Odor after 1 hour | Color after 5¼ hours | Color after 7½ hours |
|---|---|---|---|
| (a) | Barely discernible | Colorless | Colorless. |
| (b) | Pungent acidic odor | Yellow | Yellow. |
| (c) | do | do | Do. |

Test 2

A sample of telomer oil designated as sample $(d)$, prepared in accordance with Example 27 and consisting of telomers of the formula $CF_2ClCCl_2(CF_2CFCl)_nCl$ where the value of $n$ is mostly in the range of from 4 to 6 and are compared as to thermal stability with similar samples of commercially available telomer oils designated as samples $(e)$ and $(f)$ of similar molecular weight and also prepared from the olefin $CF_2=CFCl$. The test is conducted in the same manner as Test 1 with the following results:

| Sample | Color after 2½ hours | Color after 8 hours |
|---|---|---|
| (d) | Colorless | Colorless. |
| (e) | do | Yellow. |
| (f) | Yellow | Do. |

Test 3

A sample of telomer oil prepared in accordance with Example 26 designated as sample $(g)$ and consisting of a mixture of telomers of the formula $$CF_3CCl_2(CF_2CFCl)_nF \text{ and } CF_3CFCl(CF_2CFCl)_nF$$

where the value of $n$ is mostly in the range of 4 to 6, is compared with respect to thermal stability with a commercial fluorinated telomer oil of similar molecular weight [sample $(h)$] also prepared from the olefin $CF_2=CFCl$ by prior art methods. The test is conducted in the same manner as Test 1. Sample $(g)$ remained colorless, with no apparent change in viscosity after 21 hours while sample $(h)$ turned yellow after 5½ hours.

Test 4

A sample of telomer oil prepared in accordance with Example 27 and consisting of telomers of the formula $CF_2ClCCl_2(CF_2CFCl)_nCl$ where the value of $n$ is mostly in the range of from 5 to 7 [sample $(i)$] is compared with respect to corrosion properties with the two commercially available telomer oils of similar molecular weight prepared by prior art procedures from the olefin $CF_2=CFCl$ samples $[(j)$ and $(k)]$. The test is carried out by immersing copper strips in each telomer oil which have been plated with lead, the thickness of the lead plating varying from one end of the strip to the other from three millionths to one hundred millionths of an inch. The degree of corrosion is measured by the extent to which the lead plating is removed from the copper strip. The strips are immersed for a period of 120 hours while the telomer oil in each case is maintained at a temperature of 71° C. The results of this test are indicated in the table below.

| Sample: | Lead Removed—Millionths of an inch |
|---|---|
| (i) | None |
| (j) | 7 to 14 |
| (k) | 7 to 14 |

After 19 days of immersion, the strips immersed in sample $(i)$ showed no perceptible corrosion.

In addition to the excellent stability of the chlorinated telomer oils of the invention having repeating $-(CF_2CFCl)-$ groups they have also been found to have the important advantage of excellent miscibility with silicone oils. Silicone oils themselves have the advantages of good heat and chemical stability, low volatility, and good viscosity temperature characteristics (i.e. relatively small changes in viscosity with temperature). For many applications however, they lack adequate lubricant properties particularly for sliding friction and where relatively heavy loads are involved. It has been found that the addition of minor amounts of telomer oils having repeating $-(CF_2CFCl)-$ units greatly improve the lubricity of silicone oils as disclosed for example in U.S. Patents 2,742,428 and 2,927,893. In order to take practical advantage of this improved lubricity however, it is necessary that the telomer oils have good miscibility with (i.e. solubility in) the silicones. This is important for a number of reasons. First, only limited improvement in lubricity is obtained where small amounts of the telomer oils are used. Thus, while five percent of the telomer oil may be sufficient to prevent actually welding or freezing together of the metal parts, larger proportions e.g. 20%, are required to prevent rapid wear under heavy load. Good miscibility is vital for operation at low temperatures to prevent phase separation. For example, if the telomer oil is not miscible in all proportions with the silicone at ordinary temperatures phase separation will often occur below 0° centigrade. Finally miscibility of relatively heavy telomer oil fractions is highly desirable. Miscibility problems between the telomer oils and silicones increase with increasing molecular weight of the telomer oil, the lighter fractions being more soluble. The lighter telomer oils however are quite volatile particularly in contrast to the silicones and thus it is desirable to use heavier telomer oils to avoid rapid loss of the telomer component at elevated operating temperatures.

The chlorinated telomer oils of the invention having repeating $-(CF_2CFCl)-$ units particularly those of the formula $CF_2ClCCl_2(CF_2CFCl)_nCl$, have markedly better miscibility in silicone oils than other telomer oils currently available and having similar properties in other respects. Comparative tests were made among (a) telomer oils of the invention of the formula $$CF_2ClCCl_2(CF_2CFCl)_nCl$$

using representative fractions where the average value of $n$ varies from about 2 to about 5 (b) telomer oils of the formula $Cl(CF_2CFCl)_nCl$ of corresponding molecular weight and (c) telomer oils resulting from the fluorination of telomers of the formula $CCl_3(CF_2CFCl)_nH$. Three types of silicone oils were used, viz. dimethyl silicones, methylphenyl silicones and methylchlorophenyl silicones of varying viscosity ranges. The miscibility of the three types of telomer oils of varying viscosities in these silicones was determined at 70° F. The results are tabulated in Table I.

and thiolesters of the formula

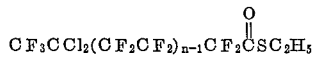

respectively. The formation of the halosulfates and conversion of the halosulfates into such derivatives are described in detail in application Serial No. 735,702 of Murray Hauptschein et al., filed May 16, 1958.

Although any of the telomer iodides produced in accordance with the invention may be coverted into halosulfates and thence into various derivatives, telomer iodides of the series $RCCl_2(CF_2CF_2)_nI$, prepared from the olefin tetrafluoroethylene, and particularly those where X is fluorine and Y is fluorine or a perfluoroalkyl radical such as those of the formula $CF_3CCl_2(CF_2CF_2)_nI$ or $CF_3CF_2CCl_2(CF_2CF_2)_nI$ where the value of $n$ is in the range of 2 to 6 are of particular interest since from these telomer iodides derivatives may be obtained which are perfluorinated with the exception of the single $-CCl_2-$

TABLE I

| Telomer oil—Type | Viscosity, centistokes at 100° F. | Miscibility in silicone oils | | | | | | |
|---|---|---|---|---|---|---|---|---|
| | | Dimethyl silicones | | Methyl phenyl silicones | | | | Methylchlorophenyl silicones, 50 cs. viscosity* |
| | | 50 cs. viscosity* | 1,000 cs. viscosity* | 50 cs. viscosity* | 100 c.s. viscosity* | 500 c.s. viscosity* | 1000 cs. viscosity* | |
| $CF_2ClCCl_2(CF_2CFCl)_nCl$ | 3 | 100 | 100 | 100 | 100 | 100 | 100 | 100 |
| | 4.2 | 100 | 100 | 100 | 100 | 100 | 100 | 100 |
| | 18.7 | 100 | 40.0 | 100 | 100 | 100 | 100 | 100 |
| | 21.6 | 100 | 40.0 | 100 | 100 | 100 | 100 | 100 |
| | 50 | 33.3 | 25.8 | 100 | 100 | 100 | 100 | 100 |
| | 388 | 20.3 | >10 | 100 | 40.0 | ca. 20 | >10 | 100 |
| $Cl(CF_2CFCl)_nCl$ | 3 | 100 | 64.6 | 100 | 100 | 100 | 100 | 100 |
| | 25 | 32.2 | 23.7 | 100 | 32.3 | 27.7 | 25.2 | 100 |
| | 220 | >10 | >10 | 24.5 | >10 | >10 | >10 | 11.8 |
| Fluorination of $CCl_3(CF_2CFCl)_nH$ | 5 | 38.6 | 24.3 | 100 | 48.5 | 35.1 | 23.8 | 100 |
| | 15.3 | | 19.5 | 24.5 | | | 23.0 | 11.8 |

*Viscosity in centistokes at 77° F.

As is apparent from the above, telomers of the invention of comparable viscosity range are soluble to a much greater degree than the two other types of commercially available telomer oils tested.

The telomer iodides of the invention, as well as being useful intermediates for conversion into oils, greases and waxes by chlorination or fluorination as described above, may be also readily converted into many types of derivatives by reacting the iodide with chlorosulfonic acid or fluosulfonic acid to form a chlorosulfate or fluorosulfate which may then be readily converted into derivatives such as carboxylic acids, esters, amides and thioesters. For example, telomer iodides prepared from tetrafluoroethylene according to the invention such as $$CF_3CCl_2(CF_2CF_2)_nI$$

may be readily converted into chlorosulfates of the formula $CF_3CCl_2(CF_2CF_2)_nOSO_2Cl$ by reaction of the iodide with chlorosulfonic acid. By reaction of the chlorosulfate e.g., with water, ethyl alcohol, ammonia, ethyl amine or ethyl mercaptan, there may be formed respectively carboxylic acids of the formula

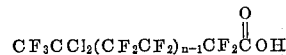

esters of the formula

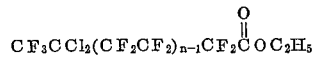

amides of the formula

and

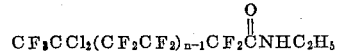

group located in a non-terminal position in the molecule. These derivatives accordingly have properties approaching those of perfluorocarbon derivatives such as perfluorocarbon acids, amides, etc. which are well known for their marked surface active properties, resulting from a combination of the perfluoro portion of the molecule which is substantially non-polar with a polar functional group such as a carboxyl, ester, amide, etc. group attached to the fluorinated portion. Such compounds are particularly useful as surface treating and coating agents in that they are adsorbed on a substrate surface with a highly fluorinated portion projecting outwardly to provide an exposed, inert, non-polar surface that is both oleophobic and hydrophobic. Thus, as treating agents for textile materials, such compounds provide a combination of flame resistance, water repellency and resistance to spotting by oil and grease.

While the acids, esters, etc. prepared from telomers based on the olefin $CF_2=CFCl$ do not have the exceptionally high surface active properties characteristic of the more highly fluorinated telomers prepared from the olefin $CF_2=CF_2$, they do possess surface properties which are excellent in contrast to many other materials such as hydrocarbon acids, esters, etc. This is particularly true of derivatives prepared from fluorochlorocarbon telomers which have a terminal perfluoroalkyl group. Such derivatives may be prepared (through halosulfate intermediates as described above) from telomer iodides of the formula $CF_2YCCl_2(CF_2CFCl)_nI$ where Y is fluorine or a perfluoroalkyl radical preferably having from one to six carbon atoms, and thus these telomer iodides represent a particularly preferred class under the invention. The perfluoroalkyl end group of such derivatives (e.g. of the acid $CF_3CCl_2(CF_2CFCl)_4CF_2COOH$ prepared from the telomer iodide $CF_3CCl_2(CF_2CFCl)_5I$) in contrast to the perfluorochloroalkyl end group of derivatives of similar telomers (e.g. of the acid $CF_2ClCFCl(CF_2CFCl)_4CF_2COOH$) apparently markedly increases the surface active properties of the molecule as a whole. The exceptional chemical stability and improved surface properties of such acids, esters and their derivatives provided by the terminal perfluoroalkyl group makes these particularly useful for such uses as additives to electroplating baths, such as chrome plating baths or as additives to metal pickling baths containing oxidizing acids to improve wetting of the metal surfaces by the bath.

We claim:

1. A method for preparing halogenated telomer iodides of narrow ranges of molecular weight and containing at least two olefin derived units per telomer molecule which comprises contacting in a reaction zone maintained under a super-atmospheric pressure of at least 200 lbs./in.$^2$ gage and in the absence of a catalyst an olefin selected from the class consisting of $CF_2=CFCl$, $CF_2=CF_2$, and mixtures thereof, with an iodide of the formula $RCCl_2I$ where R is selected from the class consisting of fluorine and CFXY-radicals where X is selected from the group consisting of chlorine and fluorine and where Y is selected from the group consisting of chlorine, fluorine, bromine and perfluoroalkyl, perfluorochloroalkyl, perfluorohydroalkyl, and perfluorochlorohydroalkyl radicals, maintaining said reaction zone at a temperature ranging from 120° C. to 160° C. and supplying to said reaction at least two moles of olefin for each mole of said iodide.

2. A method in accordance with claim 1 in which said reaction temperature ranges from 130° C. to 150° C.

3. A method in accordance with claim 1 in which the olefin is $CF_2=CFCl$.

4. A method in accordance with claim 1 in which the olefin is $CF_2=CF_2$.

5. A method in accordance with claim 1 in which the olefin is a mixture of $CF_2=CFCl$ and $CF_2=CF_2$.

6. A method in accordance with claim 1 in which said reaction is carried out at a super-atmospheric pressure of at least 300 lbs./in.$^2$ gage.

7. A method in accordance with claim 1 in which said reaction is carried out in a sealed autoclave.

8. A method in accordance with claim 1 in which the reaction is carried out with a constant pressure of olefin.

9. A method in accordance with claim 1 in which said reaction is carried out in a sealed autoclave, and wherein said autoclave is charged with a mixture of olefin and iodide in a molar ratio of olefin:iodide of from 3:1 to 15:1.

10. A method in accordance with claim 1 in which said reaction is carried out at a constant pressure of olefin and under a reaction pressure of from 300 lbs. to 2000 lbs./in.$^2$ gage.

11. A method for preparing halogenated telomer iodides of narrow ranges of molecular weight and containing at least two olefin derived units per telomer molecule which comprises contacting the olefin $CF_2=CFCl$ in a reaction zone maintained under a super-atmospheric pressure of at least 200 lbs./in.$^2$ gage and in the absence of a catalyst with an iodide selected from the class consisting of $CF_2ClCCl_2I$ and $CF_3CCl_2I$, maintaining such reaction zone at a temperature ranging from 120° C. to 160° C. and supplying to said reaction zone at least two moles of olefin for each mole of iodide.

12. A method in accordance with claim 11 in which the the reaction is carried out at temperatures of from 130° to 150° C.

13. A method for preparing halogenated telomer iodides of narrow ranges of molecular weight and containing at least two olefin derived units per telomer molecule which comprises contacting the olefin $CF_2=CF_2$ in a reaction zone maintained under a super-atmospheric pressure of at least 200 lbs./in.$^2$ gage and in the absence of a catalyst with an iodide selected from the class consisting of $CF_2ClCCl_2I$ and $CF_3CCl_2I$, maintaining said reaction zone at temperatures ranging from 120° C. to 160° C. and supplying to said reaction at least two moles of olefin for each mole of said iodide.

14. A method in accordance with claim 13 in which the the reaction is carried out at temperatures of 130° C. to 150° C.

References Cited by the Examiner
UNITED STATES PATENTS

| | | | |
|---|---|---|---|
| 2,880,247 | 3/1959 | Miller | 260—653.1 |
| 3,046,304 | 7/1962 | Haszeldine | 260—653.1 |

OTHER REFERENCES

Hauptschein et al.: Journal Am. Chem. Soc., 79, 2549–2553 (1957).

LEON ZITVER, *Primary Examiner.*

DANIEL D. HORWITZ, *Examiner.*

UNITED STATES PATENT OFFICE
CERTIFICATE OF CORRECTION

Patent No. 3,219,712                                    November 23, 1965

Murray Hauptschein et al.

It is hereby certified that error appears in the above numbered patent requiring correction and that the said Letters Patent should read as corrected below.

Column 3, line 8, for "molcule" read -- molecule --; line 26, for "autocalve" read -- autoclave --; column 5, line 17, for "alumina" read -- aluminum --; column 9, line 3, for "140 C." read -- 140° C. --; column 10, line 71, for "resired" read -- desired --; column 13, line 4, for "$CF_3CCl_2(CF_2CF_2)_2I$." read -- $CF_3CCl_2(CF_2CF_2)I$. --; column 15, line 42, strike out "and", first occurrence; column 17, lines 19 and 42, for "770° F.", each occurrence, read -- 77° F. --; column 18, line 58, for "extropolated" read -- extrapolated --; line 73, for "19:66" read -- 19.66 --; column 19, line 42, for "1,912" read -- 1.912 --; column 20, line 2, before "while" insert -- hour --; column 21, line 30, strike out "prepared in accordance in accordance with Exampleo]8v"; same column, Test 1, in the table, third column, line 3 thereof, for "do" read -- Colorless --.

Signed and sealed this 27th day of September 1966.

(SEAL)
Attest:

ERNEST W. SWIDER                                              EDWARD J. BRENNER
Attesting Officer                                            Commissioner of Patents